United States Patent [19]

Traverse et al.

[11] Patent Number: 5,374,014
[45] Date of Patent: Dec. 20, 1994

[54] SYSTEM FOR CONTROL OF AN AERODYNAMIC SURFACE OF AN AIRCRAFT

[75] Inventors: Pascal Traverse, Tournefeuille; Xavier Le Tron, Toulouse, both of France

[73] Assignee: Aerospatiale Societe Nationale Industrielle, Paris, France

[21] Appl. No.: 994,907

[22] Filed: Dec. 22, 1992

[30] Foreign Application Priority Data

Jan. 20, 1992 [FR] France .................. 92 00529

[51] Int. Cl.$^5$ ................ B64C 13/36; B64C 13/40
[52] U.S. Cl. ...................... 244/227; 244/78
[58] Field of Search .......... 244/76 R, 78, 195, 227, 244/226

[56] References Cited

U.S. PATENT DOCUMENTS

| | | | |
|---|---|---|---|
| 3,027,878 | 4/1962 | Keyt et al. | 121/41 |
| 3,221,229 | 11/1965 | Kezer et al. | 244/195 |
| 4,019,697 | 4/1977 | Tippetts | 244/78 |
| 4,826,110 | 5/1989 | Le | 244/78 |
| 4,913,032 | 4/1990 | Wernberg | 91/361 |
| 5,135,186 | 8/1992 | Ako | 244/195 |

FOREIGN PATENT DOCUMENTS

| | | |
|---|---|---|
| 2615345 | 10/1977 | Germany . |
| 800958 | 9/1958 | United Kingdom . |
| 1744001 | 6/1992 | U.S.S.R. ............... 244/195 |

Primary Examiner—Michael S. Huppert
Assistant Examiner—Virna Lissi Ansley
Attorney, Agent, or Firm—Fisher, Christen & Sabol

[57] ABSTRACT

System for control of an aerodynamic surface (1) of an aircraft, comprising an intentional actuation member (5) and a hydraulic jack (2) intended to deflect said aerodynamic surface (1).

According to the invention, the system comprises means (14) for detecting the difference in pressures prevailing in said jack (2), on either side of the piston (2C) of the latter, and calculation means (11) comprising:

- a computer delivering values of a coefficient which is a decreasing function of said difference in pressures; and
- a multiplier receiving an electrical signal (dp) representing a demanded deflection and said coefficient and addressing a first deflection command (C2) formed by the product of said signal and said coefficient to said servovalve.

14 Claims, 2 Drawing Sheets

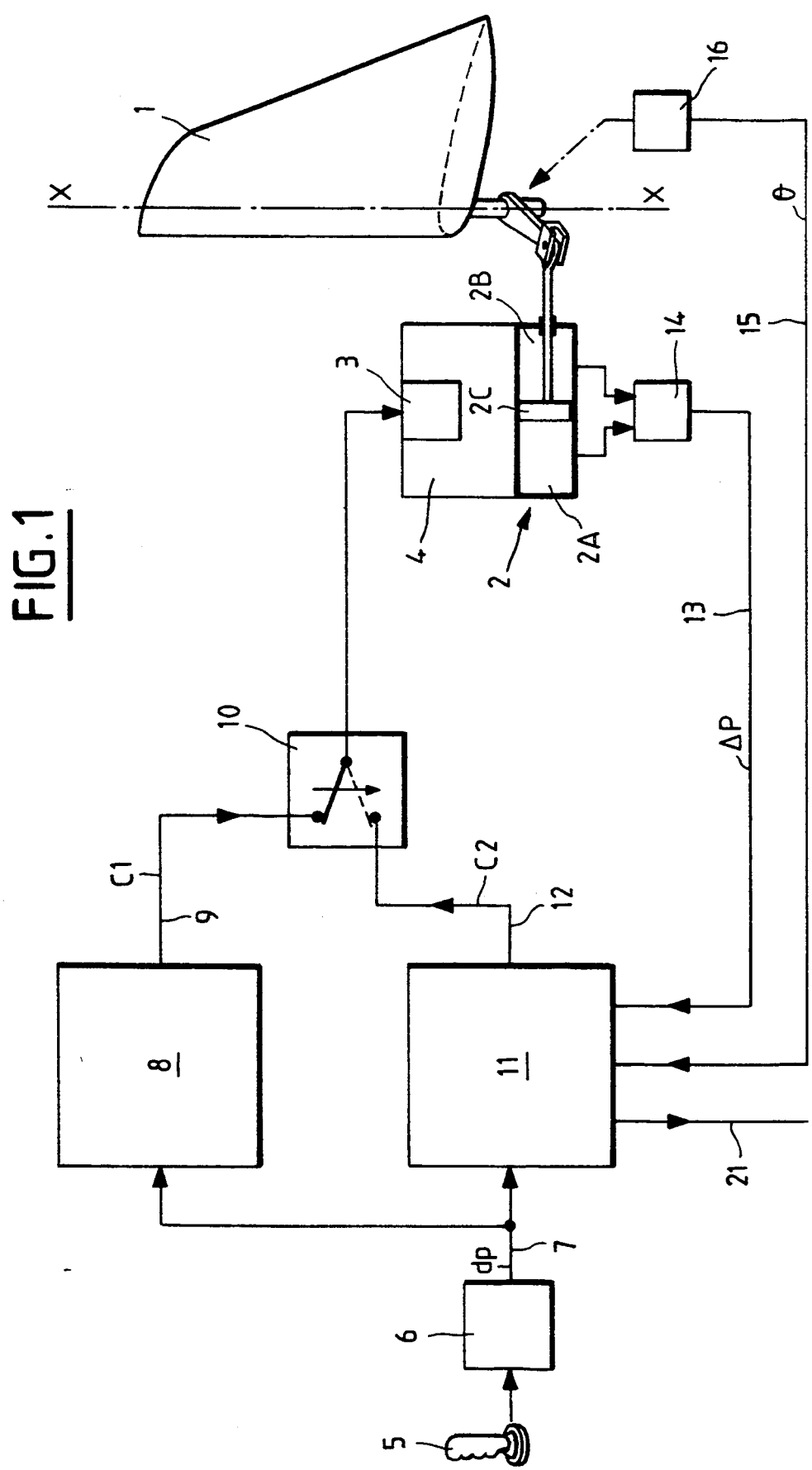

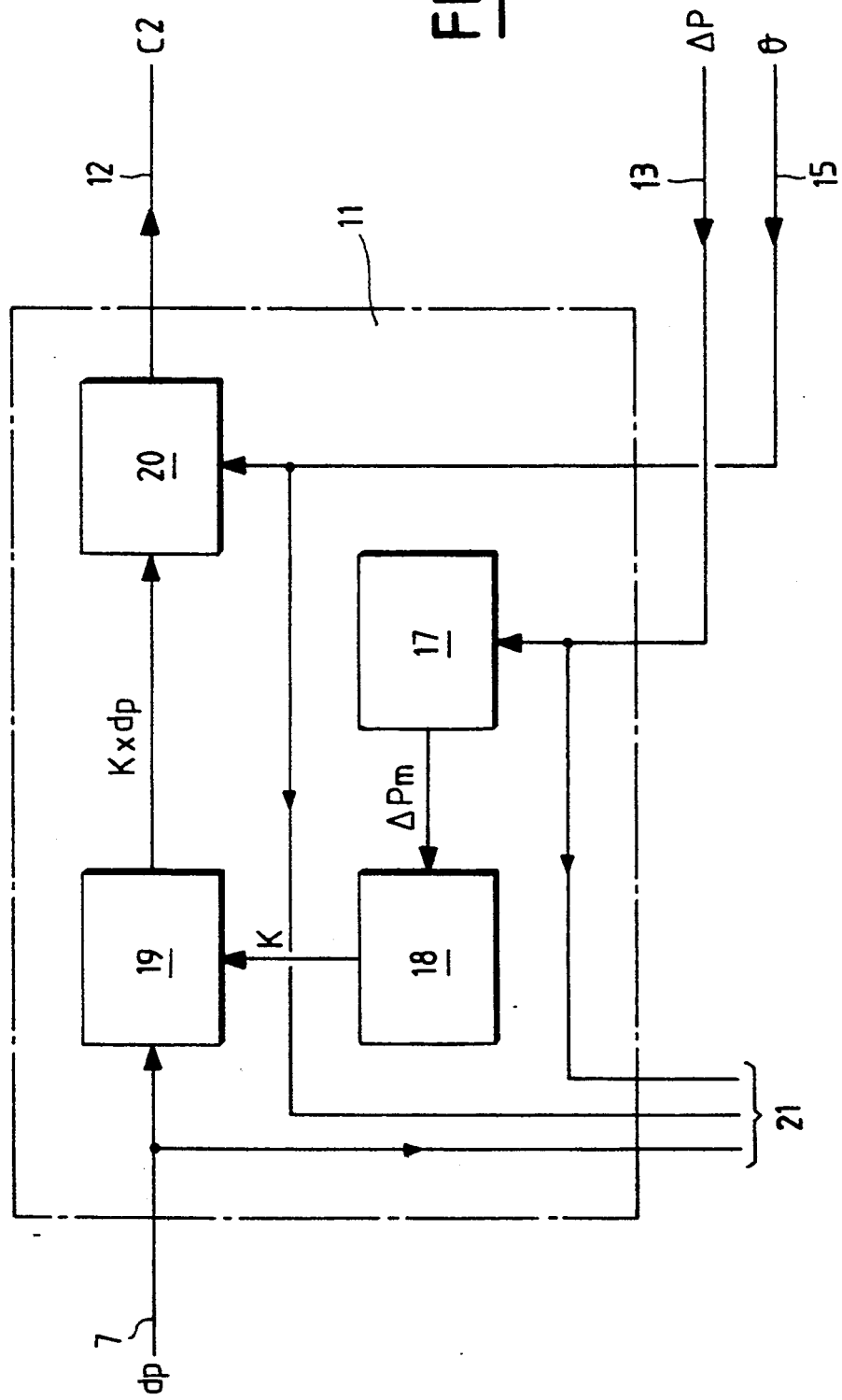

SYSTEM FOR CONTROL OF AN AERODYNAMIC SURFACE OF AN AIRCRAFT

The present invention relates to a system for control of an aerodynamic surface of an aircraft, such as an aileron, elevator and rudder.

It is known that the known systems of this type comprise:
- an intentional actuation member, available to the pilot, for example a control column or rudder pedals, said actuation member being associated with a transducer for delivering an electrical signal representing a demanded deflection of said aerodynamic surface;
- a hydraulic jack intended to deflect said aerodynamic surface under the control of a servovalve and of a servocontrol; and
- calculation means receiving said electrical signal representing a demanded deflection and deriving a deflection command addressed to said servovalve.

In order to derive such a deflection command, said calculation means receive, in addition to said electrical signal representing a demanded deflection, a plurality of anemometric and inertial information items. This results in said calculation means being complex and expensive.

The object of the present invention is to produce a system for control of an aerodynamic surface of an aircraft, which is simple, safe and relatively inexpensive.

To this end, according to the invention, the system for control of an aerodynamic surface of an aircraft, comprising:
- an intentional actuation member associated with a transducer for delivering an electrical signal representing a demanded deflection of said aerodynamic surface;
- a hydraulic jack intended to deflect said aerodynamic surface under the control of a servovalve and of a servocontroller; and
- first calculation means receiving said electrical signal representing a demanded deflection and deriving a deflection command addressed to said servovalve;

is noteworthy in that:
- it comprises means for detecting the difference in pressures prevailing in said jack, on either side of the piston of the latter; and
- said first calculation means comprise:
  - a computer delivering values of a coefficient which is a decreasing function of said difference in pressures; and
  - a multiplier receiving said electrical signal representing a demanded deflection and said coefficient and addressing a first deflection command formed by the product of said signal and said coefficient to said servovalve.

Hence, in the system according to the present invention, the pressure difference between the two chambers of the jack acting on the aerodynamic surface are used as information on the aerodynamic situation of the aircraft and a control law is employed according to which the demanded position of the aerodynamic surface is proportional to the position of the intentional actuation member, the proportionality factor (constituted by said coefficient) being a function of the speed of the aircraft in order to offer an acceptable handling quality. In effect, said pressure difference in the jack is representative of the aerodynamic load applied to said aerodynamic surface, which is itself a function of the speed of the aircraft.

Hence it is seen that the control system according to the invention, which limits itself only to pressure difference information, may be very greatly simplified. The computer which it comprises may be analog or digital.

Said computer may calculate the values of said coefficient in real time, as a function of the instantaneous value of said difference in pressures. However, it may be sufficient for said computer to deliver a fixed value of said coefficient for each of a few regions subdividing the range of possible variations in said difference in pressures, a range representing that of the possible variations in the speed of the aircraft.

Preferably, in order to retain a margin between the stresses acceptable by the structure of the aircraft and the loadings which would result from an optimal maneuver demanded by this system in accordance with the invention, there is further provided a deflection detector for said aerodynamic surface and deflection limiting means receiving said first deflection command and linked to said deflection detector.

Moreover, in order to avoid troublesome fluctuations in the measurement of said difference in pressures by said detection means, it is advantageous for said first calculation means to comprise a device for averaging said difference in pressures which is addressed to said computer. Such an averaging is preferably carried out by a moving average method.

The system according to the present invention may moreover comprise:
- second calculation means also receiving said electrical signal representing a demanded deflection and deriving a second deflection command for said aerodynamic surface; and
- a two-position changeover switch capable of addressing one or the other of said first or second deflection commands to said servovalve.

Said changeover switch may preferably address the second deflection command generated by said second calculation means to said servovalve, the first deflection command generated by said first calculation means being addressed to said servovalve by means of said changeover switch only when said second calculation means are defective.

Hence, said second calculation means, which may derive the second deflection command from a plurality of anemometric and inertial information items as is usual, have the job of a normal control system, while said first calculation means have the job of an emergency control system.

It will be noted that the emergency control system thus obtained by implementing the invention is more advanced than the known emergency systems generally employed, which slave the position of the aerodynamic surface to that of the intentional actuation member, without a correction as a function of the speed of the aircraft or of another aerodynamic parameter. In effect, the emergency system formed by the first calculation means of the invention takes account of the speed of the aircraft, so that the fact of losing the normal system following a failure in the latter is less critical than with known emergency systems.

Moreover, it will be noted that said first calculation means may be different from said second calculation means, such that the safety level is enhanced.

Moreover, said first calculation means, forming the emergency system, do not need to be self-monitored, which simplifies their construction.

In effect, their probability of giving an invalid command is of the order of $10-5/h$. However, they are induced to delivery such an invalid command only after the failure of the normal system, which equally exhibits a failure probability of the order of $10^{-5}/h$, so that the combination of the two events has a probability less than $10-9/h$.

So as to detect the possible breakdowns in the pressure difference detector, in the transducer associated with the intentional actuation member, in the deflection detector and in the associated electronics, it is advantageous for said first calculation means periodically to address, to a maintenance device, the values of the difference in pressures, of the electrical signal representing the demanded deflection and of the measured deflection. Hence, the maintenance device may compare the measurements transmitted by said first calculation means with the corresponding measurements delivered by said second calculation means. Breakdowns in the other elements, such as the servovalve or the link between said first calculation means and the servovalve, may be brought to light by a periodic test; for example, the electrical power supply to said second calculation means is cut off, the intentional actuation member is moved and a check is made that the aerodynamic surface moves in the correct direction.

The figures of the attached drawing will make it clear how the invention can be embodied. In these figures, identical references designate similar elements.

FIG. 1 shows the block diagram of a system in accordance with the invention for control of an aerodynamic surface of an aircraft.

FIG. 2 is the block diagram of an embodiment of the computer of the system of FIG. 1.

The control system in accordance with the present invention, shown diagrammatically in FIG. 1, is intended to control an aerodynamic surface 1 of an aircraft (not shown), this aerodynamic surface being, for example, an aileron, an elevator, or a rudder of said aircraft. The aerodynamic surface 1 is capable of pivoting around an axis X—X, under the action of a hydraulic jack 2 controlled, in the usual way, by means of a servovalve 3 and a servocontrol 4.

To this end, said control system comprises a movable intentional actuation member, such as a pivoting control column 5 available to the pilot. The control column 5 is linked to a transducer 6, delivering, at its output 7, an electrical signal dp representing the angular movement imposed by the pilot on said control column 5 and thus the direction and the amplitude of the pivoting desired for the aerodynamic surface 1 around the axis X—X.

The output 7 of the transducer 6 is linked to calculation means 8, which, from the signal dp and items of anemometric and inertial information, derive a control command C1. The output 9 of the control system 8 addresses the control command C1 to the servovalve 3, which, by means of the servocontrol 4, consequently actuates the jack 2 in order to cause the aerodynamic surface 1 to pivot around the axis X—X.

Between the output 9 of the control system 8 and the servovalve 3 a two-position changeover switch 10 is arranged, and the command C1 is transmitted to the servovalve 3 by means of the rest position (in solid lines in FIG. 1) of the changeover switch 10.

Moreover, other calculation means 11 are arranged in parallel with the calculation means 8, in accordance with the present invention.

The calculation means 8 are provided in order to exert the principal control of the aerodynamic surface 1. The calculation means 11 constitute emergency means, intervening when the calculation means 8 become defective. As soon as a breakdown in the calculation means 8 appears, the changeover switch 10 moves over to take up its working position (in dotted lines in FIG. 1) so as to connect the output 12 of the calculation means 11 with the servovalve 3, the latter then being isolated from the output 9 of the calculation means 8.

The emergency calculation means 11 receive:
the signal dp generated by the transducer 6 and available on the output 7 of the latter;
a signal $\Delta P$ originating from the output 13 of a sensor 14 measuring the pressure difference prevailing in the chambers 2A and 2B of the jack 2 which are delimited by the piston 2C of the latter; and
a signal $\theta$ originating from the output 15 of a detector 16 measuring the pivoting angle of the aerodynamic surface 1 around the axis X—X.

As FIG. 2 shows, the emergency calculation means 11 comprise an averaging device 17, to which the pressure difference signal $\Delta P$ measured by the sensor 14 is addressed, and which delivers an averaged pressure difference signal $\Delta Pm$. The averaging of the signal $\Delta P$ may be carried out in various ways. For example, it may be carried out so as to take account of two previous measurements of $\Delta P$.

In this case, if at successive instants ti-2, ti-1 and ti, the measurements of the signal $\Delta P$ are respectively equal to $\Delta Pi$-2, $\Delta Pi$-1 and $\Delta Pi$, the averaging device 17 may deliver, for the instant ti, an averaged value $\Delta Pmi$ equal to $$\Delta Pmi = \Delta Pi + \Delta Pi-1 + \Delta Pi-2 / 3$$

Needless to say, according to requirements, it may be advantageous to vary the number of previous measurements $\Delta Pi$-1, $\Delta Pi$-2, $\Delta Pi$-3, etc. taken into account for the calculation of $\Delta Pi$. It may perhaps be possible to apply multiplier coefficients to some of said measurements $\Delta Pi$, $\Delta Pi$-1, etc.

Whatever form it takes, the device 17 delivers, at each instant, a moving average $\Delta Pm$ of the signal $\Delta P$.

The emergency calculation means 11 further comprise a computer 18 which makes a value of a coefficient K correspond to each value $\Delta Pmi$, the value of said coefficient K being smaller as the value $\Delta Pmi$ is larger.

The values of the coefficient K may be calculated by the computer 18 in step with the arrival of the values $\Delta Pmi$. In a variant, the values of the coefficient K may be preset and stored in memory and the computer 18 delivers such a preset value on the basis of the value $\Delta Pmi$ which it receives from the averaging device 17.

The correspondence between the values of the coefficient K and those of the mean $\Delta Pmi$ may be of the following type:
if the mean $\Delta Pmi$ is less than or equal to a value P1, then the coefficient K takes a value K1;
if the mean $\Delta Pmi$ is greater than the value P1 and less than or equal to a value P2, then the coefficient K takes a value K2;
if the mean $\Delta Pmi$ is greater than the value P2 and less than or equal to a value P3, then the coefficient K takes a value K3;

...
if the mean ΔPmi is greater than the value Pn, then the coefficient K takes a value Kn+1, with P1<P2 <... <Pn and K1>K2>... >Kn+1.

The values of the coefficient K generated by the computer 18 are addressed to a multiplier 19 which, moreover, receives the signal dp from the output 7 of the transducer 6. The multiplier 19 delivers, at its output, the signal K×dp.

The signal K×dp is addressed to the output 12 of the calculation means 11 in order to form an emergency control signal C2, transmitted to the servovalve 3.

Between the multiplier 19 and its output 12 is preferably arranged a limiting device 20, which receives the signal θ from the detector 16 for the position of the aerodynamic surface 1. Hence, the signal C2 may be limited to an appropriate value, in the event that the value K×dp might risk giving rise to too great a deflection of the aerodynamic surface 1 around the axis X—X.

Moreover, via a link 21, the calculation means 11 are able to periodically address the signals dp, ΔP and θ to a maintenance device which is not shown, which receives corresponding measurements originating from the calculation means 8. Hence, by comparison, said maintenance device is able to verify the status of the calculation means 11, while the calculation means 8 are in operation.

Hence it is seen that, by virtue of the invention, there is obtained a particularly robust and economic (in terms of mass and of cost) flight control installations 5, 6, 11, 10, 3, 4, 2, 14, 16, which is nevertheless capable of providing great safety. Such a flight control installation needs only a reduced quantity of information (ΔP, θ), allowing it to carry out a practically complete function even in the absence of items of aerodynamic and inertial information, without entailing a heavy workload for the crew.

Although not exclusively, such a flight control installation is thus particularly intended to be employed as emergency for a more sophisticated main flight control installation.

We claim:

1. A system for control of an aerodynamic surface (1) of an aircraft, comprising:
   (a) an intentional actuation member (5) associated with a transducer (6) for delivering an electrical signal (dp) representing a demanded deflection of said aerodynamic surface (1);
   (b) a hydraulic jack (2) intended to deflect said aerodynamic surface (1) under the control of a servovalve (3) and of a servocontroller (4);
   (c) means (14) for detecting the difference in pressures (ΔP) prevailing in said jack (2), on either side of the piston (2C) of the latter; and
   (d) first calculation means receiving said electrical signal (dp) representing a demanded deflection and deriving a deflection command addressed to said servovalve (3), said first calculation means (11) comprising:
   (i) a computer (18) delivering values of a coefficient (K) which is a decreasing function of said difference in pressures (ΔP); and
   (ii) a multiplier (19) receiving said electrical signal (dp) representing a demanded deflection and said coefficient (K) and addressing a first deflection command (C2) formed by the product of said signal and said coefficient to said servovalve, said computer (18) calculating the values of said coefficient (K) in real time, as a function of the instantaneous value of said difference in pressures (ΔP).

2. The system as claimed in claim 1 which also comprises a deflection detector (16) for said aerodynamic surface and deflection limiting means (20) receiving said deflection command and linked to said deflection detector (16).

3. The system as claimed in claim 1 wherein said first calculation means (11) also comprises a device (17) for averaging said difference in pressures which is addressed to said computer (18).

4. The system as claimed in claim 1 wherein said computer (18) is of the analog type.

5. The system as claimed in claim 1 wherein said computer (18) is of the digital type.

6. The system as claimed in claim 1 which also comprises:
   (e) second calculation means (8) also receiving said electrical signal (dp) representing a demanded deflection and deriving a second supplementary deflection command (C1) for said aerodynamic surface; and
   (f) a two-position changeover switch (10) capable of addressing one or the other of said first or second deflection commands (C1 or C2) to said servovalve (3).

7. The system as claimed in claim 6 wherein said changeover switch (10) addresses said second deflection command (C1) generated by said second calculation means (8) to said servovalve (3), said first deflection command (C2) generated by said first calculation means (11) being addressed to said servovalve by means of said changeover switch only when said second calculation means (8) are defective.

8. A system for control of an aerodynamic surface (1) of an aircraft, comprising:
   (a) an intentional actuation member (5) associated with a transducer (6) for delivering an electrical signal (dp) representing a demanded deflection of said aerodynamic surface (1);
   (b) a hydraulic jack (2) intended to deflect said aerodynamic surface (1) under the control of a servovalve (3) and of a servocontroller (4);
   (c) means (14) for detecting the difference in pressures (ΔP) prevailing in said jack (2), on either side of the piston (2C) of the latter; and
   (d) first calculation means receiving said electrical signal (dp) representing a demanded deflection and deriving a deflection command addressed to said servovalve (3), said first calculation means (11) comprising:
   (i) a computer (18) delivering values of a coefficient (K) which is a decreasing function of said difference in pressures (ΔP); and
   (ii) a multiplier (19) receiving said electrical signal (dp) representing a demanded deflection and said coefficient (K) and addressing a first deflection command (C2) formed by the product of said signal and said coefficient to said servovalve,
   said computer (18) delivering a fixed value (K1, K2, ... Kn+1) of said coefficient (K) for each of a few regions subdividing the range of possible variations in said difference in pressures (ΔP).

9. The system as claimed in claim 8 which also comprises a deflection detector (16) for said aerodynamic surface and deflection limiting means (20) receiving said deflection command and linked to said deflection detector (16).

10. The system as claimed in claim 8 wherein said first calculation means (11) also comprise a device (17) for averaging said difference in pressures which is addressed to said computer (18).

11. The system as claimed in claim 8 wherein said computer (18) is of the analog type.

12. The system as claimed in claim 8 wherein said computer (18) is of the digital type.

13. The system as claimed in claim 8 which also comprises:

(e) second calculation means (8) also receiving said electrical signal (dp) representing a demanded deflection and deriving a second supplementary deflection command (C1) for said aerodynamic surface; and (f) a two-position changeover switch (10) capable of addressing one or the other of said first or second deflection commands (C1 or C2) to said servovalve (3).

14. The system as claimed in claim 13 wherein said changeover switch (10) addresses said second deflection command (C1) generated by said second calculation means (8) to said servovalve (3), said first deflection command (C2) generated by said first calculation means (11) being addressed to said servovalve by means of said changeover switch only when said second calculation means (8) are defective.

* * * * *